(12) United States Patent
Okada et al.

(10) Patent No.: US 9,387,801 B2
(45) Date of Patent: Jul. 12, 2016

(54) VEHICLE DRIVING MODE DISPLAY DEVICE AND PROGRAM FOR DISPLAYING VEHICLE DRIVING MODE

(71) Applicant: HORIBA, Ltd., Kyoto (JP)

(72) Inventors: Jungo Okada, Kyoto (JP); Kenichi Goto, Kyoto (JP); Hikaru Asada, Kyoto (JP); Tetsuo Sasaki, Kyoto (JP)

(73) Assignee: Horiba, Ltd., Kyoto (JP)

( * ) Notice: Subject to any disclaimer, the term of this patent is extended or adjusted under 35 U.S.C. 154(b) by 0 days.

(21) Appl. No.: 14/494,870

(22) Filed: Sep. 24, 2014

(65) Prior Publication Data

US 2015/0084762 A1 Mar. 26, 2015

(30) Foreign Application Priority Data

Sep. 24, 2013 (JP) .................................. 2013-196446

(51) Int. Cl.
  *G08B 21/18* (2006.01)
  *B60Q 3/04* (2006.01)
  *G01M 17/007* (2006.01)

(52) U.S. Cl.
  CPC ............. *B60Q 3/04* (2013.01); *G01M 17/0074* (2013.01); *G08B 21/182* (2013.01)

(58) Field of Classification Search
  CPC ...................................................... B60Q 3/04
  USPC ............ 340/441; 701/70; 702/113; 73/23.31, 73/116.05–116.11
  See application file for complete search history.

(56) References Cited

U.S. PATENT DOCUMENTS

| | | | |
|---|---|---|---|
| 5,270,628 A | 12/1993 | Noguchi et al. | |
| 2001/0013245 A1* | 8/2001 | Hanashiro | G01F 1/44 73/23.31 |
| 2010/0107750 A1* | 5/2010 | Engstrom | G01M 17/0072 73/116.05 |
| 2013/0190997 A1 | 7/2013 | Konishi | |
| 2013/0211686 A1 | 8/2013 | Shono et al. | |

FOREIGN PATENT DOCUMENTS

| | | |
|---|---|---|
| EP | 1048944 A2 | 11/2000 |
| EP | 2045592 A1 | 4/2009 |
| JP | 11-160203 A | 11/1997 |

OTHER PUBLICATIONS

EESR dated Apr. 2, 2015 issued for European patent application No. 14 003 290.5, 7 pgs.

* cited by examiner

*Primary Examiner* — Brent Swarthout
(74) *Attorney, Agent, or Firm* — Brooks Kushman P.C.

(57) ABSTRACT

A vehicle driving mode display device judges whether or not a following first condition or a following second condition is satisfied in a case that a vehicle is driven within a tolerance range, and if satisfied, issues a warning. The first condition is a case in which a difference between a standard speed indicated by the running speed pattern and the vehicle speed is gradually widened as time elapses. The second condition is a case in which the vehicle speed exceeds the tolerance range within a predetermined allowable time period when an acceleration at the moment is presumed to be kept.

7 Claims, 9 Drawing Sheets

VEHICLE DRIVING MODE DISPLAY DEVICE AND PROGRAM FOR DISPLAYING VEHICLE DRIVING MODE

CROSS-REFERENCE TO RELATED APPLICATION

This application claims priority to JP Application No. 2013-196446, filed Sep. 24, 2013, the disclosure of which is incorporated in its entirety by reference herein.

FIELD OF THE ART

This invention relates to a vehicle driving mode display device used in a case that a vehicle such as an automobile is tested in a driving mode.

BACKGROUND ART

In a driving mode test conducted by the use of a chassis dynamometer device, the vehicle driving mode display device is utilized. As shown in Japan Unexamined Patent Application Publication No. 11-160203, the vehicle driving mode display device displays a current actual speed on a running speed pattern that is previously determined by the driving mode so as to assist a test driver in driving the vehicle according to the running speed pattern.

The running speed pattern is displayed on a graph wherein time and speed are plotted on each axis. Since the running speed pattern has a tolerance range (for example, ±1 km/h, hereinafter also called as a tolerance area) and the tolerance area is expressed on the graph at the same time, the test driver drives the vehicle in such a way as to fall the actual vehicle speed in the tolerance area.

However, conventionally, a warning (an alarm) is issued for the test driver when the actual vehicle speed exceeds the tolerance range. This can be a warning about a state of continuously exceeding the tolerance range, however, it is not possible to avoid exceeding the tolerance range itself.

SUMMARY

Disclosure of the Invention

Problems to be Solved by the Invention

The present claimed invention intends to solve all of the problems and a main object of this invention is to provide a vehicle driving mode display device that prevents the actual vehicle speed from exceeding the tolerance range before it happens and that makes it possible for the test driver to drive the vehicle more easily.

Means to Solve the Problems

More specifically, a vehicle driving mode display device in accordance with this invention is characterized by having a screen where a running speed pattern, a tolerance range of the running speed pattern and a vehicle speed at a moment when a measurement is conducted (present vehicle speed) are plotted on a graph where time and the vehicle speed are plotted on each axis, judging whether or not a following first condition or a following second condition is satisfied in a case that the vehicle is driven within the tolerance range, and if satisfied, issuing a warning.

The first condition: in a case that a difference between a standard speed indicated by the running speed pattern and the vehicle speed is gradually widened as time elapses.

The second condition: in a case that the vehicle speed exceeds the tolerance range within a predetermined allowable time period when an acceleration at the moment is presumed to be kept.

Conventionally, the warning (the alarm) was issued for the test driver when the vehicle speed exceeded the tolerance range, however, it is not possible to avoid the vehicle speed exceeding the tolerance range itself, although this can be a warning against a state of exceeding the tolerance range. Meanwhile, in accordance with the arrangement of the present claimed invention, since the warning is issued only when the predetermined condition wherein the vehicle speed is expected to exceed the tolerance range is satisfied while the vehicle is driven within the tolerance range, it is possible to prevent the vehicle speed from being out of the tolerance range before it happens and for the test driver to drive the vehicle more easily.

As the more concrete first condition represented is a case that a difference between an acceleration at a first time and a standard acceleration obtained from the running speed pattern is smaller than a difference between the acceleration at a second time when a predetermine time period has passed since the first time and the standard acceleration obtained from the running speed pattern.

As the second condition represented is a case that an estimated time period required for the vehicle speed to exceed the tolerance range is shorter than the allowable time period when the acceleration at the first time is kept.

In accordance with the arrangement if the vehicle speed is kept between an upper limit judgment initiation speed as being a speed that is within the tolerance range and that is higher than the standard speed indicated by the running speed pattern by a first predetermined value and a lower limit judgment initiation speed as being a speed that is within the tolerance range and that is lower than the standard speed indicated by the running speed pattern by a second predetermined value, the judgment is not conducted, since the judgment in order to issue the warning is conducted only at a time when the vehicle speed exceeds the upper limit judgment initiation speed or the vehicle speed is below the lower limit judgment initiation speed, it is possible to tune a timing of issuing the warning or a frequency of issuing the warning tailored to a test driver's (user's) preference by changing a value of the upper limit judgment initiation speed and a value of the lower limit judgment initiation speed.

Meanwhile, conventionally in accordance with the European regulation, the maximum speed of some of the running speed patterns reaches 120 km/h. In this case, the full scale of the vehicle speed axis of the graph becomes big due to the maximum speed so that the tolerance range displayed in the graph becomes extremely narrow. Then, there is a problem that it becomes difficult for the test driver to see the running speed pattern.

In order to solve this problem, it is preferable that a specified area in a predetermined time period including the moment in the graph is displayed in a state of being enlarged in the vehicle speed axis direction.

The reason is even though the full scale of the vehicle speed axis becomes big on the ground that the maximum speed of the running speed pattern is big so that the tolerance range of the running speed pattern is displayed relatively narrow, the tolerance range in the specified area in the predetermined time including the moment is displayed wide because the specified area of the graph is enlarged in the vehicle speed axis direction so that it becomes easy for the test driver to conduct driving in accordance with the running speed pattern.

The running speed pattern is displayed in an end part of the graph when the speed reaches near the maximum speed or the minimum speed. If the part near the maximum speed or the minimum speed is simply enlarged, there might be a case that it fails to display the part partially because the tolerance range is cut. In order to avoid this situation, it is preferable that the vehicle speed axis of the graph is scrolled or can be scrolled so as to locate the running speed pattern at the moment near the center of the vehicle speed axis range in the graph.

If the specified area is enlarged so as to make the running speed pattern displayed in the specified area continuous with the running speed pattern in an ordinary display area that is adjacent to a future side of the specified area, since a boundary of the running speed pattern extending from the moment to the future between the specified area and the ordinary display area is continuous and produces no difference in level. As a result of this, it becomes easy for the test driver to intuitively grasp a future change of the running speed pattern, thereby enabling easy driving.

Effect of the Invention

In accordance with this invention having the above arrangement, in a case that the vehicle is driven within the tolerance range, since the warning is issued when the predetermined condition in which it is expected to be out of the tolerance range is satisfied, it is possible to prevent being out of the tolerance range before it happens so that the test driver can drive the vehicle more easily.

BEST MODES OF EMBODYING THE INVENTION

One embodiment of a vehicle driving mode display device in accordance with this invention will be explained with reference to drawings.

The vehicle driving mode display device 2 is used for a vehicle test system 100.

First, an outline of this vehicle test system 100 will be explained.

Figure 1:
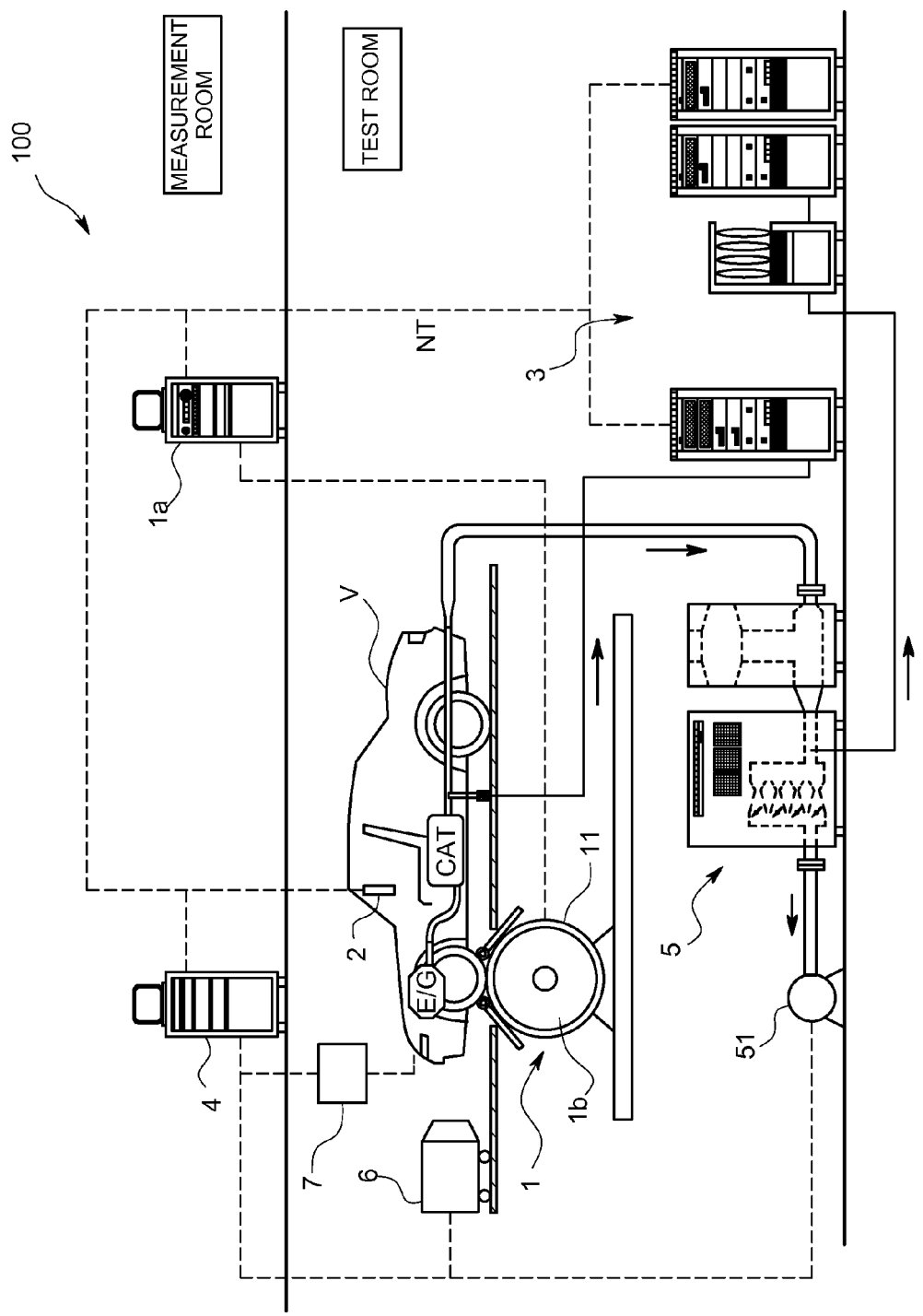
FIG. 1 is a pattern view showing a whole configuration of a vehicle test system of this embodiment.

The vehicle test system 100 conducts a driving test in a predetermined driving mode on a vehicle in a room called as a cell in order to conduct an analysis of an exhaust gas or a measurement of a fuel efficiency at a time of the driving test. As its overall configuration is shown in FIG. 1, the vehicle test system 100 comprises a chassis dynamometer device 1, an exhaust gas measuring device 3, a measurement managing device 4 and a vehicle driving mode display device 2, each of which is arranged in a measurement room and a test room each of which is divided air-tightly.

The chassis dynamometer device 1 is, for example, of a uniaxial type, and comprises a dynamometer body 1b having a roller 11 on which a driving wheel of a vehicle (V) is loaded and a dynamometer control device 1a that gives a driving load that is the same as that of the vehicle (V) on a road by controlling the roller 11. The dynamometer control device 1a makes use of, for example, a computer system comprising a CPU, a memory or the like, and has a function of being able to interactively communicate a control signal, a data or the like from outside. FIG. 1 shows the chassis dynamometer device 1 for a 2-wheel-drive vehicle or a front-wheel-drive vehicle, however, it is a matter of course that a pair of rollers may be provided in the front and the back so as to cope with a 4-wheel-drive vehicle, or the roller may be of a two-axle type.

The exhaust gas measuring device 3 is equipped with multiple gas analyzers each of which has a different measurement principle, and is able to continuously measure each component such as HC, NOx, CO, $CO_2$ or the like contained in an exhaust gas of an engine respectively. In this embodiment, it is also possible to measure a weight of CO, HC, NO per unit travelling distance by being combined with an exhaust gas constant capacity sample collecting device 5 that samples the diluted exhaust gas made by diluting the exhaust gas with the atmosphere as the sample gas by a constant capacity. The exhaust gas measuring device 3 comprises a computer system that makes use of a CPU, a memory or the like, and has a function of being able to interactively communicate the control signal or the data from the outside.

The measurement managing device 4 is a computer system comprising a body part made of, for example, a CPU, a memory, a communication port or the like and a console made of a display, an input device or the like. Then, the measurement managing device 4 gives or receives the data through a net work (NT) such as LAN or the like between the dynamometer control device 1a and the exhaust gas measuring device 3 so that it is possible to control the dynamometer control device 1a, the exhaust gas measuring device 3 or other instrument (a fan for cooling a vehicle 6, a vehicle information obtaining device 7, a blower 51 for sucking an exhaust gas 51, an air conditioning for room or the like, or to obtain the data.

Concretely explained, each instrument (the instrument is a concept including devices or elements constituting the device, and in addition to the dynamometer control device 1a, the exhaust gas measuring device 3, the fan for cooling vehicle 6, the device for obtaining vehicle information 7, the blower for sucking exhaust gas 51, and the air conditioning for room, there is a case that includes the elements constituting these instruments) is registered in a body part of the measurement managing device 4, and it is so configured to be able to display a running state, a measurement result, alarm information of the registered instrument in a state of a numerical value, a text or a graphic on the display, and to control the running state of each instrument by the use of the input device. To control is, for example to initiate/to halt the operation, to set or to change a load in a case of the chassis dynamometer device 1, and to initialize each of the gas analyzers, to initiate/to halt the measurement, to change the measurement condition, to conduct correction or to ON/OFF the blower 51 in a case of the exhaust gas measuring device 3.

Furthermore, the measurement managing device 4 gives or receives the data to or from the vehicle driving mode display device 2 through the net work (NT) such as LAN or the like, and also comprises the control part that can control the vehicle driving mode display device 2 or obtain the data. The arrangement is not limited to this and a control of the vehicle driving mode display device 2 may be provided in addition to the measurement managing device 4.

The vehicle driving mode display device 2 comprises a body part having a CPU and a memory, a display arranged outside or inside of a vehicle, for example, near a front window so as to make it possible for a test driver to conduct a visual confirmation, and an input device. The vehicle driving mode display device 2 is used in a case that the test driver runs the vehicle in the driving mode. The input device is, for example, a touch panel or a remote controller integrally attached to a display.

Figure 2:
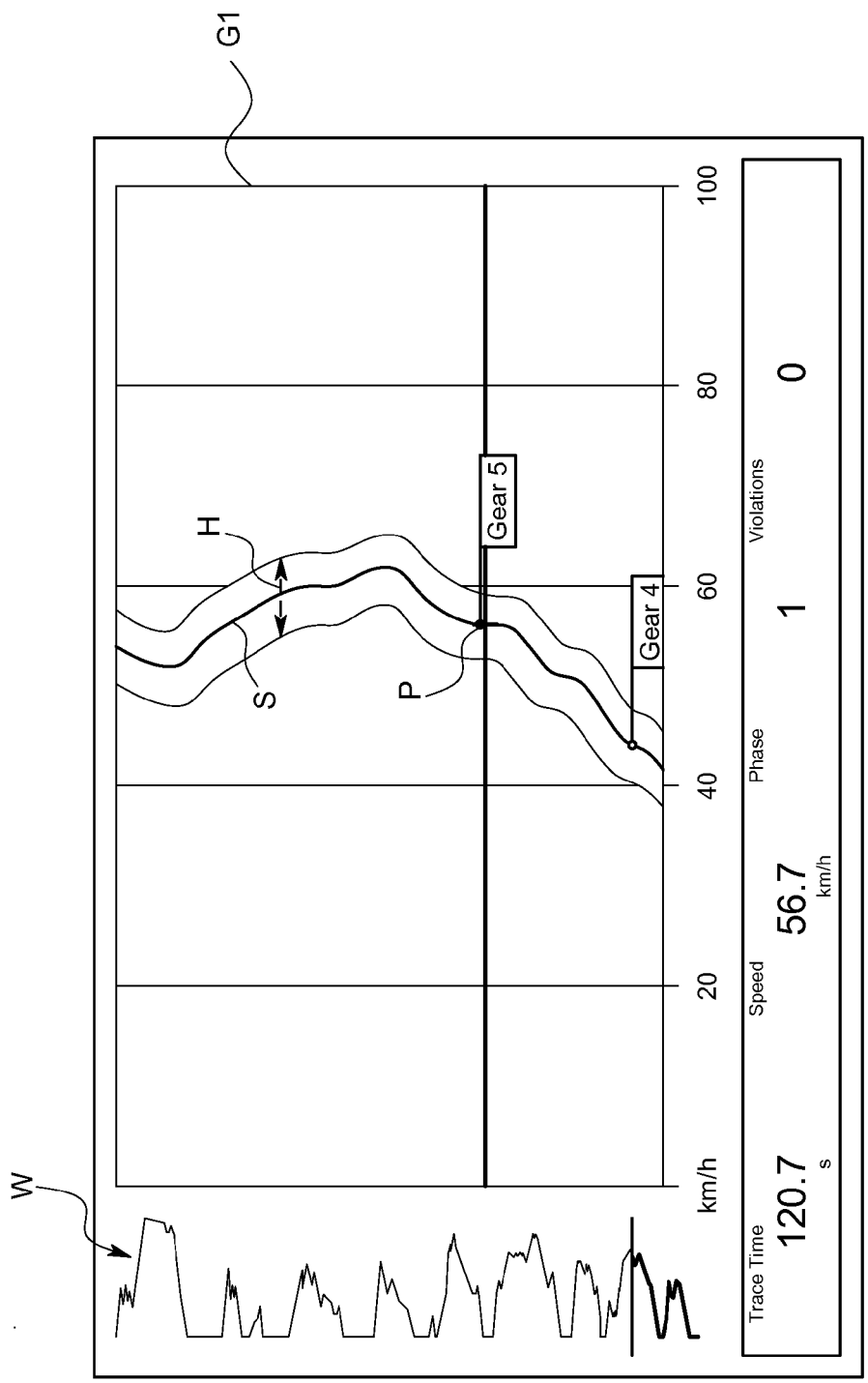
FIG. 2 is a screen view showing one example of a screen displayed on a vehicle driving mode display device of this embodiment.

Concretely, as shown in FIG. 2, the vehicle driving mode display device 2 displays a graph (G1) plotted with the time as the vertical axis and a vehicle speed as the horizontal axis (the axes may be reversed) on the display screen, and a running speed pattern (S) determined by the driving mode, a tolerance range (H) obtained based on the running speed pattern (S) and a maker (P) indicating the vehicle speed at the moment are displayed on the graph (G1) by operating the CPU or the like based on the program stored in the memory. The upper direction indicates a future side on the graph (G1) in FIG. 2.

A scale of this graph (G1) is automatically set by the vehicle driving mode display device 2 so as to make the maximum speed (plus a given value) determined by the running speed pattern (S) as a full scale on the vehicle speed axis. A whole view of a running speed pattern (W) and a test progress status are displayed as other information on one side of the graph (G1) and a trace time or an actual vehicle speed, a phase, violations or the like are displayed with a numerical value on the lower part of the graph (G1).

The running speed pattern (S) and the tolerance range (H) are previously registered in the memory, and can be newly registered or changed by a user such as the test driver by means of the input device of the measurement managing device 4 that has the control part of the vehicle driving mode display device 2.

The actual vehicle speed is obtained by obtaining a dynamometer roller speed from the chassis dynamometer device 1 and by transforming the obtained dynamometer roller speed into a speed of the vehicle (V). The actual vehicle speed may be obtained from the vehicle (V).

In addition, the vehicle driving mode display device 2 receives a number of revolution of an engine, a WOT (a throttle opening), a boost pressure, an atmospheric pressure, a dry bulb temperature, or a wet bulb temperature through the vehicle information obtaining device 7, and processes them by means of an internal computer and it is also possible to display the processed data as a numerical value format or a graph format, although not shown in drawings, on the display screen.

Figure 3:
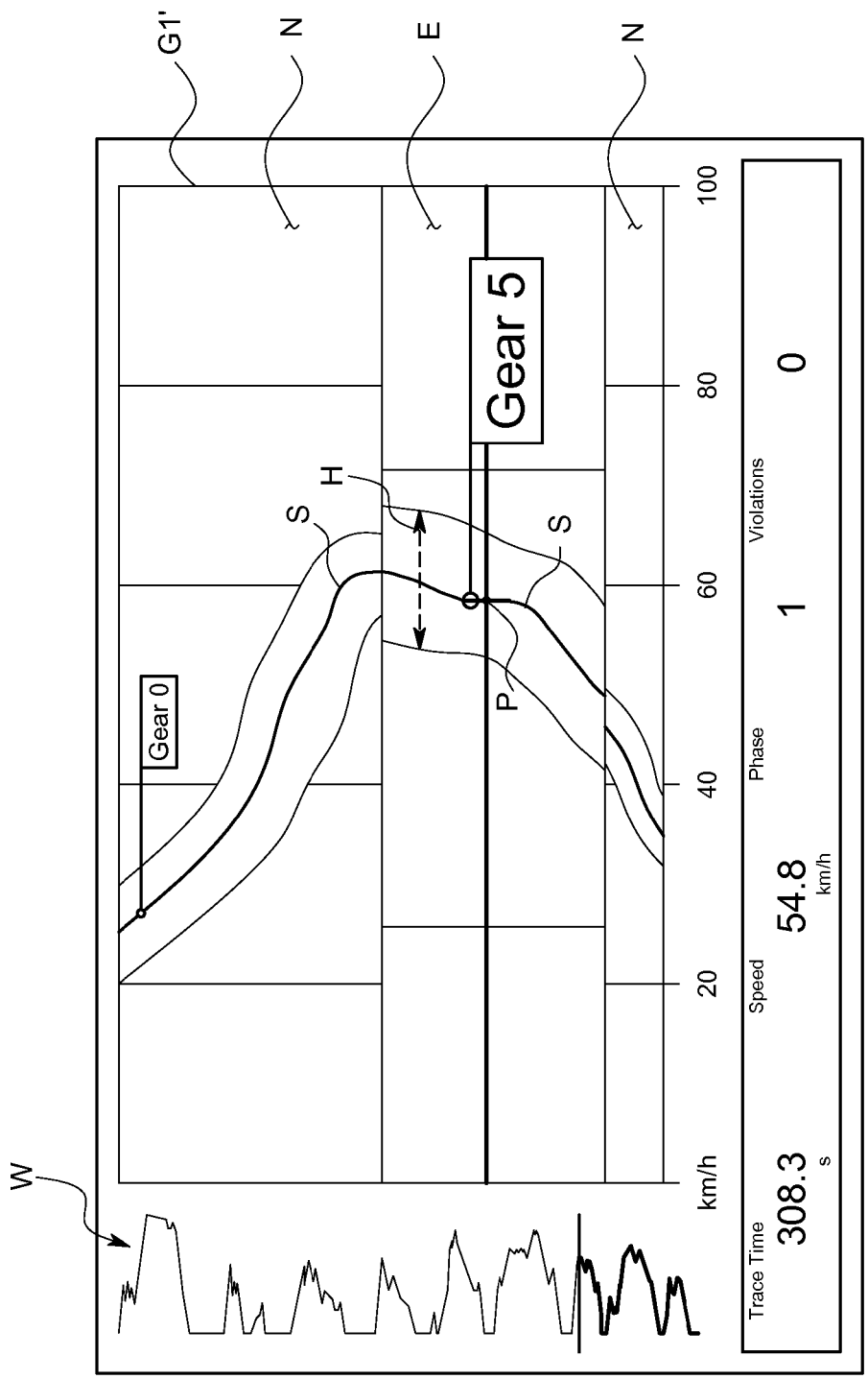
FIG. 3 is a screen view showing one example of the screen displayed on the vehicle driving mode display device of this embodiment.

Then, as shown in FIG. 3, the vehicle driving mode display device 2 in this embodiment is so configured to be able to display a specific area (E) within a predetermined time period before and after the present time in the graph (G1) in an enlarged form only in the vehicle speed axis direction. Before and after the enlarged specific area (E) is an ordinary display area (N) expressed in an ordinary scale, namely in a scale wherein the vehicle speed axis is expressed in the full scale.

A graph (G1') shown in FIG. 3 and the graph (G1) shown in FIG. 2 are switchable on a setting screen, not shown in drawings. For example, in a case that it is expected that the maximum speed of the running speed pattern (S) is high and the full scale becomes big so that the tolerance range (H) is displayed relatively small, it is possible for the user to previously set the screen to be the display mode in FIG. 3 prior to the running test. This may be automatically switched. Concretely, in a case that the display size of the tolerance range (H) on the screen becomes smaller than or equal to a predetermined threshold value by judging from the full scale of the vehicle speed axis, the vehicle driving mode display device 2 may automatically set the display mode to be the display mode of the graph (G1') in FIG. 3 prior to the running test.

The display scale of the specified area (E) is freely determined in the setting screen, however, the display scale of the specified area (E) may be automatically set, for example, so as to make the tolerance range (H) constant on a constant basis on the screen. A time range before and after the present time of the specified area (E) may be set freely by a user or may be fixed.

In addition, a center of the enlarged specified area (E) is a point where a boundary line in the future side of the ordinary display area (N) crosses the running speed pattern (S) of the specified area (E). With this arrangement, since the running speed pattern (S) displayed in the specific area (E) is continuous with the running speed pattern (S) displayed in the ordinary area (N) that locates adjacent to the future side of the specified area (E), it becomes easy for the test driver to monitor the movement of the running speed pattern (S).

Figure 4:
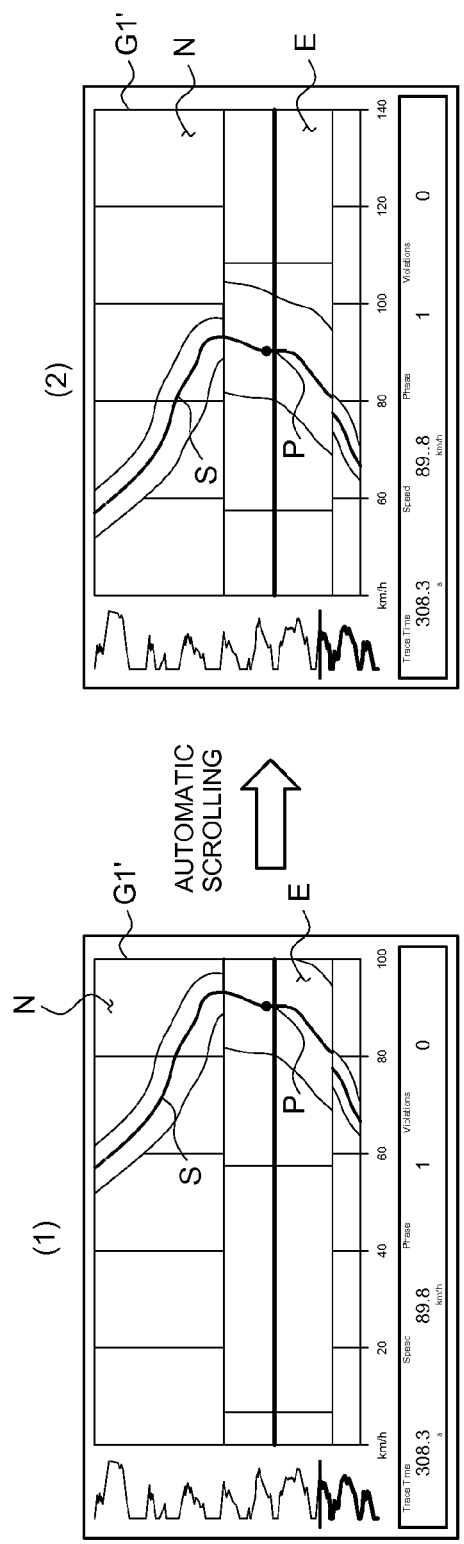
FIG. 4 is a screen view showing one example of the screen displayed on the vehicle driving mode display device of this embodiment.

Furthermore, in this embodiment, when the vehicle speed approaches the predetermined range of the full scale, the vehicle driving mode display device 2 scrolls the vehicle speed axis from an initial display state shown in FIG. 4 (1) to a display mode shown in FIG. 4 (2) so as to make the running speed pattern (S) at the moment locate near the center in the vehicle speed axis range of the graph (G1') as shown in FIG. 4 (2). Meanwhile, when the actual vehicle speed falls out of the predetermined range, the state is returned to the initial display state shown in FIG. 4 (1).

This is because when the vehicle speed approaches near the maximum speed of the running speed pattern (S), the running speed pattern (S) moves to an end part of the graph (G1'). Then, if the running speed pattern (S) of the moved part is simply enlarged, a part of the tolerance range (H) is broken, resulting in generating some area that is not displayed.

Then, in accordance with this arrangement, even though a case that the full scale of the vehicle speed axis becomes big due to a reason that the maximum speed of the running speed pattern (S) is increased so that the tolerance range (H) of the running speed pattern (S) is displayed relatively narrow, the specified area (E) within the predetermined time period around the present time is displayed in the enlarged manner in the vehicle speed axis direction so that the tolerance range (H) is displayed big. This makes it possible for the test driver to easily drive the vehicle (V) along the running speed pattern (S).

Meanwhile, in this embodiment, even though the vehicle (V) is driven within the tolerance range (H), if a predetermined condition wherein it is expected to be out of the tolerance range (H) in the future is satisfied, a warning is issued by the vehicle driving mode display device 2. The warning may use various means such as displaying on the screen and a voice.

The predetermined condition is determined with at least the actual vehicle speed, an actual acceleration, a standard speed indicated by the running speed pattern, a standard acceleration obtained based on the running speed pattern and the tolerance range as a parameter.

A first example (the first condition in claims) of a concrete condition of issuing the warning will be explained.

First, followings are setting items (the setting by the user or a fixed value).

A. An Upper Limit Judgment Initiation Speed (%)

Figure 5:
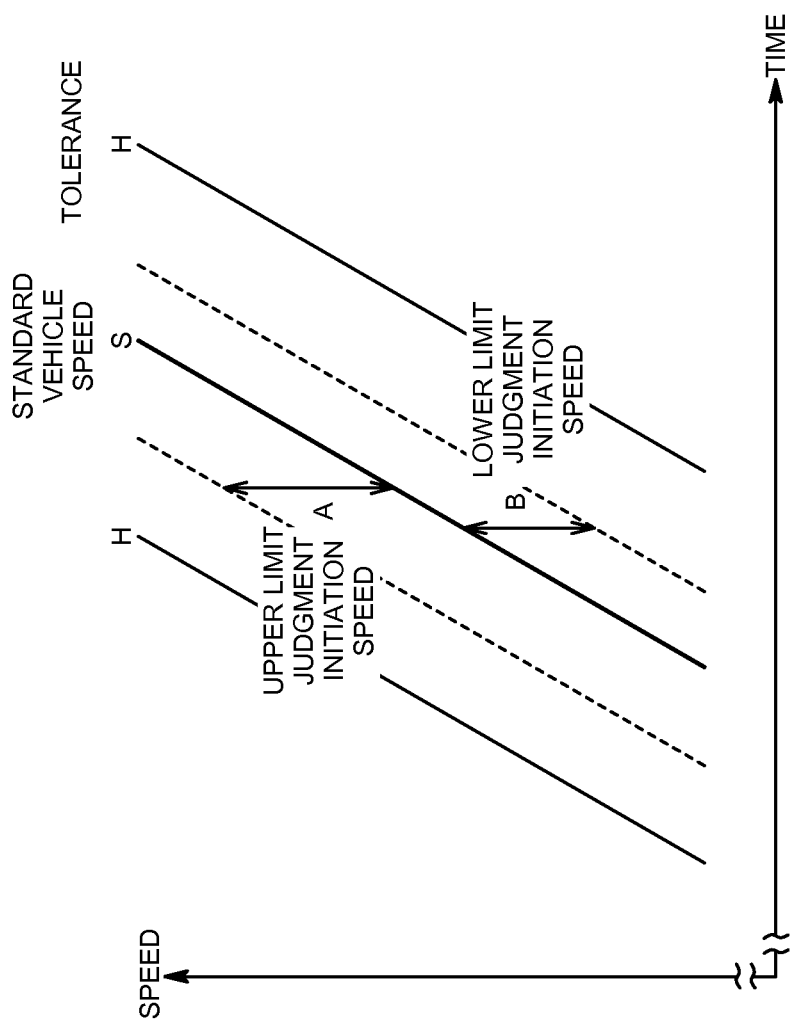
FIG. 5 is an explanatory view for explaining a condition to issue a warning for the vehicle driving mode display device of this embodiment.

The upper limit judgment initiation speed that is within the tolerance range (H) and that is higher than the standard speed by a predetermined amount is set (refer to FIG. 5). The upper limit judgment initiation speed here is set based on a ratio (%) relative to the tolerance range in the upper limit side higher than the standard speed and at a time when the actual vehicle speed exceeds the upper limit judgment initiation speed, a prediction for issuing the warning, to be described later, is initiated.

B. A Lower Limit Judgment Initiation Speed (%)

The lower limit judgment initiation speed that is within the tolerance range (H) and that is lower than the standard speed by a predetermined amount is set (refer to FIG. 5). The lower limit judgment initiation speed here is set based on a ratio (%) relative to the tolerance range in the lower limit side lower than the standard speed and at a time when the actual vehicle speed is below the lower limit judgment initiation speed, the prediction for issuing the warning, to be described later, is initiated.

C. A Judgment Suspension Number

Next, the first condition will be explained concretely.

Figure 6:
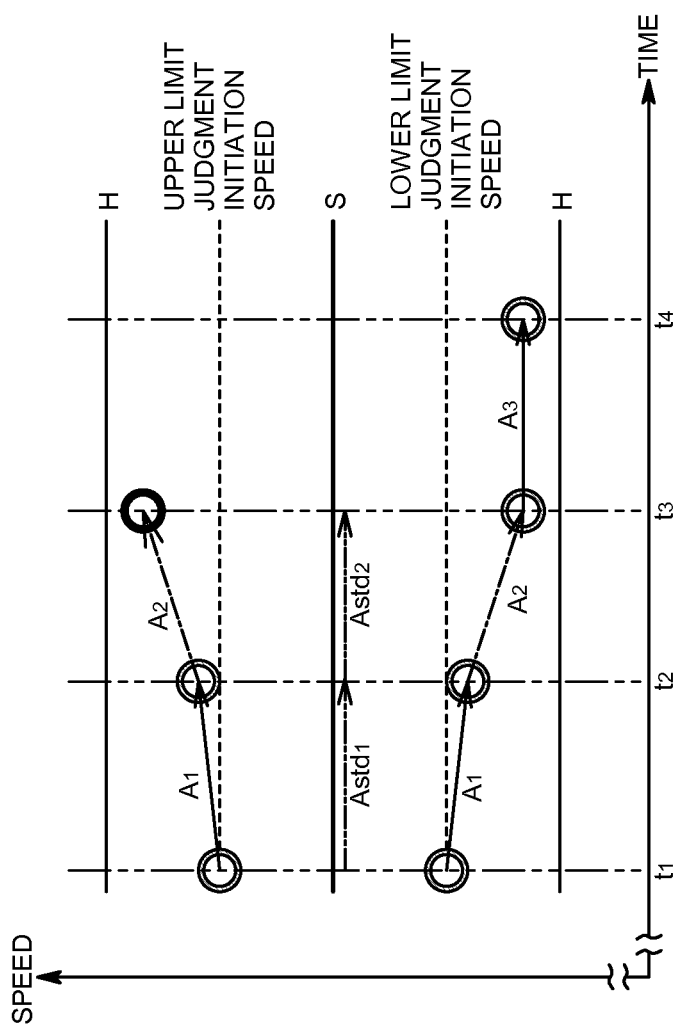
FIG. 6 is an explanatory view for explaining the condition to issue the warning for the vehicle driving mode display device of this embodiment.
Figure 7:
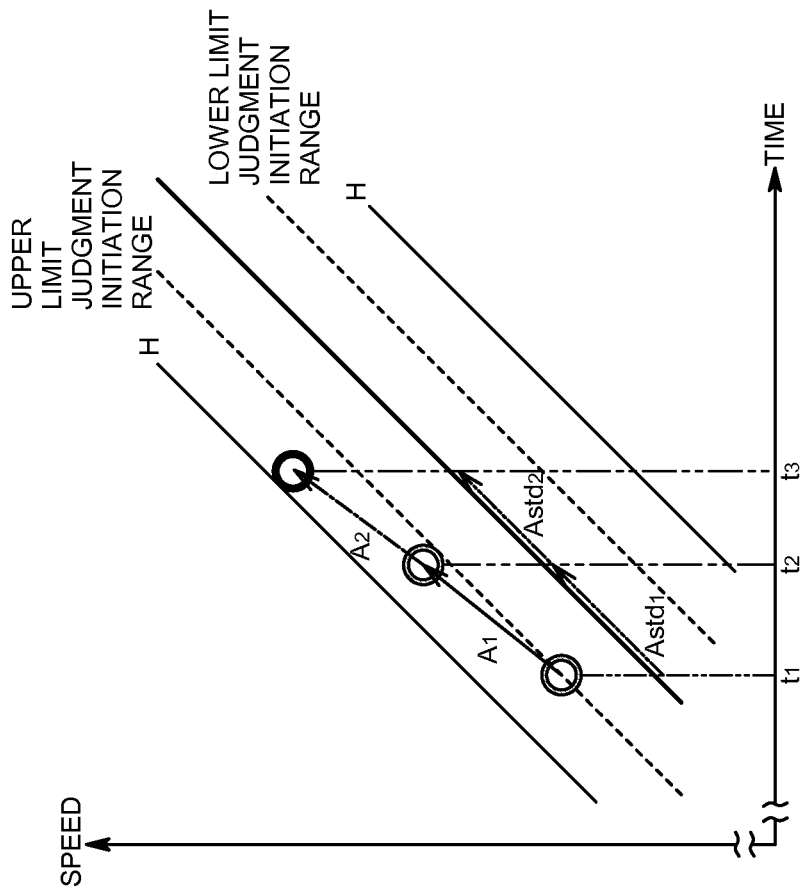
FIG. 7 is an explanatory view for explaining the condition to issue the warning for the vehicle driving mode display device of this embodiment.
Figure 8:
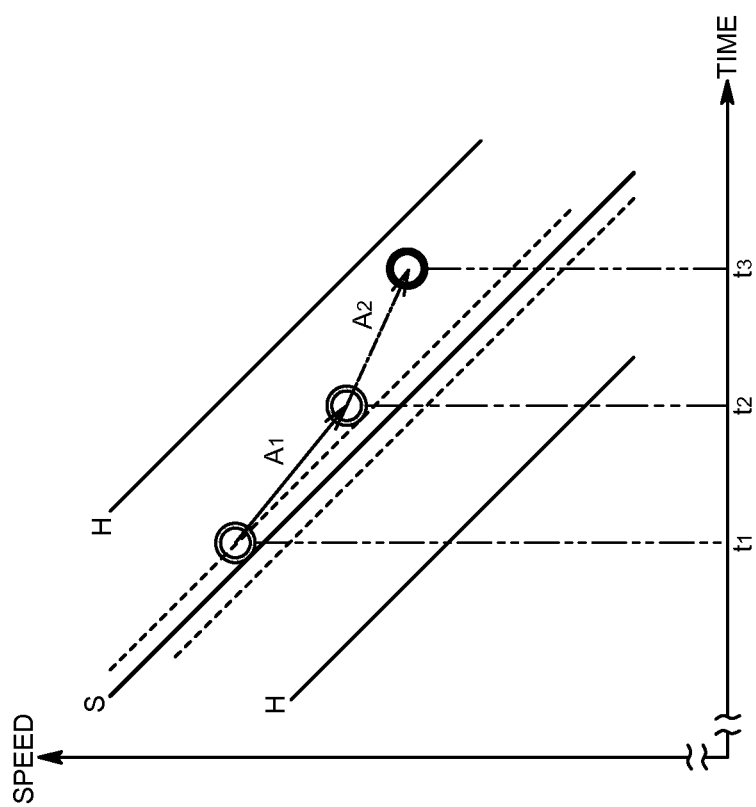
FIG. 8 is an explanatory view for explaining the condition to issue the warning for the vehicle driving mode display device of this embodiment.

As shown in FIG. 6 through FIG. 8, the judgment whether the first condition is satisfied or not is initiated from timing ($t_1$) when the speed exceeds the upper limit judgment initiation speed or the speed is below the lower limit judgment initiation speed.

In order to make the judgment, sampling of the actual vehicle speed and the standard speed is initiated at every certain period from the timing ($t_1$).

When the following expression (1) is satisfied by comparing the actual acceleration ($A_n$) at a certain sampling timing ($t_n$) (the first time, n is an integer number more than or equal to 1) with the actual acceleration ($A_n$+1) at a next sampling timing ($t_n$+1) (the second time), the warning is issued.

$$|A_n - \text{Astd}_n| < |A_{n+1} - \text{Astd}_{n+1}| \quad (1)$$

where $\text{Astd}_n$ is the standard acceleration at the timing $t_n$.

The actual acceleration ($A_n$) at the certain sampling timing ($t_n$) is obtained by dividing a value obtained by subtracting the actual vehicle speed ($VS_n$) at the timing ($t_n$) from the actual vehicle speed ($VS_{n+1}$) at the timing ($t_{n+1}$) by the time period between the timing ($t_{n+1}$) and the timing ($t_n$). The same applies also to the standard acceleration.

In FIG. 6 through FIG. 8, n=1~3.

In this first example, in a case that the actual vehicle speed exceeds the upper limit judgment initiation range or is below the lower limit judgment initiation range, the actual vehicle speed is sampled at a certain cycle. When a condition wherein a degree of separating of the actual vehicle speed from the standard speed indicated by the running speed pattern (S) during a time period from a certain timing to a next timing is bigger than a degree of separating of the actual vehicle speed from the standard speed indicated by the running speed pattern (S) during a period from the next timing to a further next timing is satisfied, the warning is issued.

In other words, it can be said that the warning is issued in a case that a deviation of the actual vehicle speed from the standard vehicle indicated by the running speed pattern (S) extends with laps of time.

In this embodiment, if n is within the judgment suspension number even though the above-mentioned condition (for example, the expression 1) is satisfied, no warning is issued. More specifically, even though the judgment whether the above-mentioned conditioned is satisfied or not is conducted for every sampling timing, it is not until the judged result shows "satisfy" continuously at more than the judgment suspension number that the alarm is issued. In addition, the judgment suspension number is reset at a time when the mode type (acceleration, deceleration, constant speed) is changed. The above is the first condition.

Next, a second example of another concrete condition (a second condition) wherein the warning is issued will be explained.

Figure 9:
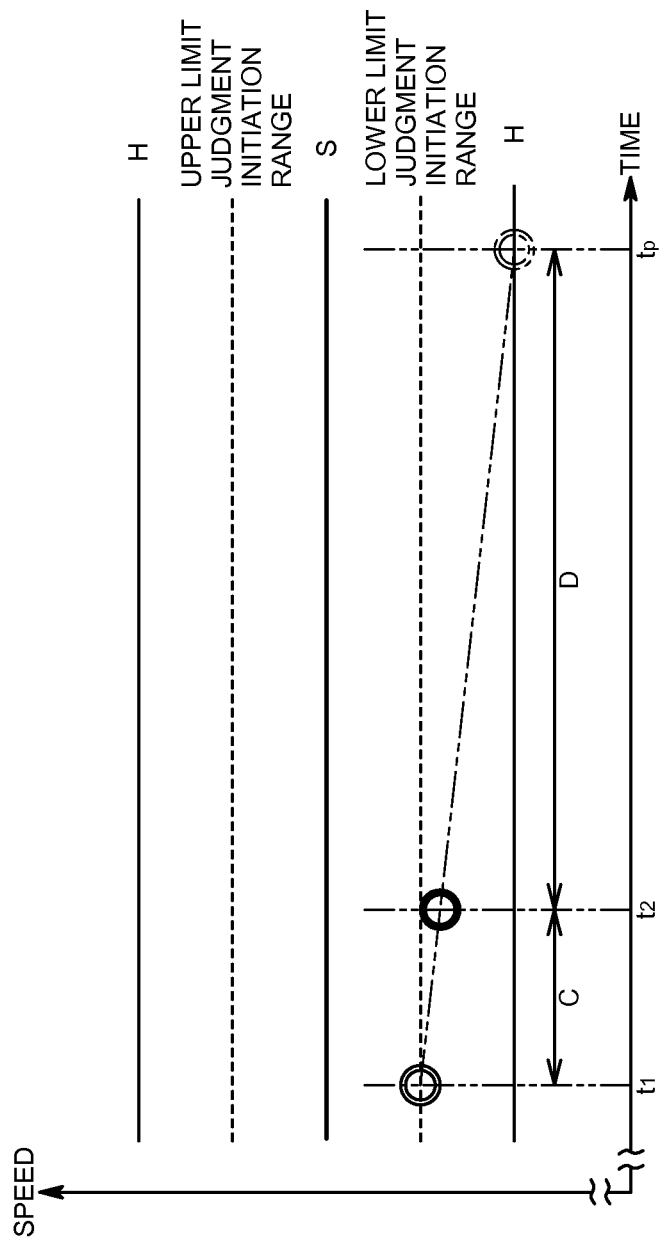
FIG. 9 is an explanatory view for explaining the condition to issue the warning for the vehicle driving mode display device of this embodiment.

As shown in FIG. 9, in a case that the actual vehicle speed exceeds the upper limit judgment initiation range or is below the lower limit judgment initiation range, sampling of the actual vehicle speed in a constant period is initiated. In a case that the actual acceleration is kept at a certain sampling timing ($t_n$), a time period (D) (time ($t_p$)) until the actual vehicle speed exceeds the tolerance range (H) is estimated and calculated. In a case that the estimated time period (D) is below the previously determined allowable time period, the warning is issued. A definition of the acceleration is the same as that of the first example.

However, similar to the first example, if n is within the judgment suspension number even thought above-mentioned condition is satisfied, no warning is issued. More specifically, even though the judgment whether the above-mentioned conditioned is satisfied or not is conducted for every sampling timing, it is not until the judged result shows "satisfy" continuously at more than the judgment suspension number that the alarm is issued. In addition, in a case that the moment and the mode type (acceleration, deceleration, constant speed) change after passing the estimated time, no judgment is conducted. The above is the second condition.

In above-mentioned each example, in a case that the actual vehicle speed exceeds the upper limit judgment initiation range or the actual vehicle speed is below the lower limit judgment initiation range in the middle of the test, an alarm that is different from the warning is issued.

In accordance with this arrangement, it is possible to prevent a case that the actual vehicle speed is out of the tolerance range (H) before it happens, and it is possible for the test driver to drive the vehicle according to the running speed pattern (S) furthermore securely within the tolerance range (H).

In addition, since an estimation is initiated to issue the warning only in a case that the actual vehicle speed is out of the upper limit judgment initiation range and the lower limit judgment initiation range, it is possible to reduce a frequency of issuing the warning to the minimum so that it is possible to avoid applying useless stress on the test driver. The same applies also to the judgment suspension number.

The present claimed invention is not limited to the above-mentioned embodiment.

For example, the arrangement wherein the vehicle speed axis of the graph is scrolled when the running speed pattern approaches the maximum speed can be applied also to the ordinary display state shown in FIG. 2.

The vehicle driving mode display device may serve only as a console function and a substantial arithmetic circuit may be served by the measurement managing device. With this arrangement, it is possible to conduct unitary management of the data.

In addition, it is a matter of course that the present claimed invention is not limited to the above-mentioned embodiment and may be variously modified without departing from a spirit of the invention.

Furthermore, the technical features stated in each embodiment of the present invention, when combined with each other, would be able to form a new technical concept.

EXPLANATION OF CODES

2 . . . vehicle driving mode display device
G1, G1' . . . graph
S . . . running speed pattern
H . . . tolerance range
E . . . specified area
N . . . ordinary display area

What is claimed is:

1. A vehicle driving mode display device comprising:
a body part having a central processing unit which acquires vehicle speed; and
a screen where a running speed pattern, a tolerance range of the running speed pattern, and a vehicle speed at a moment when a measurement is conducted are plotted on a graph where time and the vehicle speed are plotted on each axes,
wherein in a case that the vehicle is driven within the tolerance range, the central processing unit is adapted to judge whether or not a first condition or a second condition is satisfied, and if the first condition or the second condition is satisfied, to issue a warning, wherein the first condition is a case in which a difference between an acceleration at a first time and a standard acceleration obtained from the running speed pattern is less than a difference between the acceleration at a second time when a predetermined time period has passed since the first time and the standard acceleration obtained from the running speed pattern, and wherein the second condition is a case in which, if the current acceleration is to be maintained, the vehicle speed would exceed the tolerance range within a predetermined allowable time period.

2. The vehicle driving mode display device described in claim 1, wherein
the second condition is further a case in which an estimated time period required for the vehicle speed to exceed the tolerance range is less than the predetermined allowable time period when the acceleration at the first time is kept.

3. The vehicle driving mode display device described in claim 1, wherein
in a case in which the vehicle speed is kept between an upper limit judgment initiation speed as being a speed that is within the tolerance range and that is greater than the standard speed indicated by the running speed pattern by a first predetermined value and a lower limit judgment initiation speed as being a speed that is within the tolerance range and that is less than the standard speed indicated by the running speed pattern by a second predetermined value, the judgment is not conducted.

4. The vehicle driving mode display device described in claim 1, wherein
a specified area in the predetermined time period including the moment is displayed in a state of being enlarged in the vehicle speed axis direction.

5. The vehicle driving mode display device described in claim 1, wherein
the vehicle speed axis of the graph is scrolled or can be scrolled so as to locate the running speed pattern at the moment near the center of the vehicle speed axis range in the graph.

6. The vehicle driving mode display device described in claim 4, wherein
the specified area is enlarged so as to make the running speed pattern displayed in the specified area continuous with the running speed pattern in an ordinary display area that is adjacent to a future side of the specified area.

7. A recording medium for storing a computer-program for causing a vehicle driving mode display device including a body part having a central processing unit which acquires vehicle speed, to perform functions of:
displaying a screen where a running speed pattern, a tolerance range of the running speed pattern, and a vehicle speed at the moment are plotted on a graph where time and the vehicle speed are plotted on each axes;
judging whether or not a first condition or a second condition is satisfied in a case that the vehicle is driven within the tolerance range; and
if the first condition or the second condition is satisfied, issuing a warning, wherein the first condition is a case in which a difference between an acceleration at a first time and a standard acceleration obtained from the running speed pattern is less than a difference between the acceleration at a second time when a predetermined time period has passed since the first time and the standard acceleration obtained from the running speed pattern, and wherein the second condition is a case in which, if the current acceleration is to be maintained, the vehicle speed would exceed the tolerance range within a predetermined allowable time period.

* * * * *